US006394387B1

(12) United States Patent
Mitrovic

(10) Patent No.: US 6,394,387 B1
(45) Date of Patent: May 28, 2002

(54) ROTOR SHAFT SUPPORT AND DRIVE ARRANGEMENT

(75) Inventor: Lazar Mitrovic, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/742,010

(22) Filed: Dec. 22, 2000

(51) Int. Cl.[7] .............................................. B64C 27/12
(52) U.S. Cl. .................... 244/17.11; 244/60; 244/17.27
(58) Field of Search ........................... 244/17.11, 17.27, 244/54, 60; 416/170 R; 384/99, 535, 119

(56) References Cited

U.S. PATENT DOCUMENTS

| 3,679,272 A | * | 7/1972 | Costa et al. .................. 384/99 |
| 4,899,959 A | | 2/1990 | Weiler |
| 5,088,840 A | * | 2/1992 | Radtke ......................... 384/99 |
| 5,344,101 A | * | 9/1994 | Francois ....................... 244/60 |
| 5,344,239 A | | 9/1994 | Stallone et al. |
| 5,738,445 A | * | 4/1998 | Gardner ........................ 384/99 |
| 5,755,622 A | * | 5/1998 | Kanki et al. ................... 464/99 |
| 5,797,185 A | * | 8/1998 | Sammataro et al. .......... 244/60 |
| RE36,270 E | * | 8/1999 | Duggan ........................ 384/99 |
| 6,012,386 A | * | 1/2000 | Lahtinen et al. .............. 384/99 |

\* cited by examiner

*Primary Examiner*—Galen L. Barefoot
(74) *Attorney, Agent, or Firm*—Bachman & LaPointe, P.C.

(57) ABSTRACT

A rotor shaft support and drive arrangement comprises a bearing damper including a number of interconnected oil cylinders circumferentially distributed about a rotor to dampen the vibration thereof. A flexible diaphragm coupling is provided for transmitting a driving torque. The flexible diaphragm coupling provides improved misalignment capability.

30 Claims, 3 Drawing Sheets

ROTOR SHAFT SUPPORT AND DRIVE ARRANGEMENT

BACKGROUND OF THE INVENTION

1. Field of the Invention

The present invention relates to rotor shafts and, more particularly, to support and drive arrangements suited for helicopter rotors.

2. Description of the Prior Art

Over the years various arrangements have been proposed to support and transmit torque to a rotary shaft.

For instance, a helicopter mast is typically driven by an engine via a separate rotor transmission attached to the helicopter airframe by a relatively complex articulated, flexible mounting structure. The mounting structure must be designed to control the transmission of rotor flight and dynamic loads to the airframe. It would be beneficial to have a new arrangement in which the transmission would be integrated to the engine and mounted to the airframe via a simple mounting structure adapted to reduce airframe vibrations.

In certain applications where a rotor is subject to radial excursion such as by vibration, it has been proposed to use squeeze-film bearing dampers to accommodate certain radial motion caused by high-speed rotor dynamics. Typically, a damping fluid, such as oil, is introduced into an annular chamber surrounding the bearing supporting the rotor. Radial motion of the bearing together with the rotor relative to the annular chamber creates hydrodynamic forces opposing the radial motion of the bearing. The shearing action occurring upon the oil effectively dampens the radial motion.

Although such squeeze-film bearings are efficient to dampen high frequency, low energy vibrations, it has been found that there is a need for a new fluid damper which is adapted to accommodate rotor vibrations of lower frequency and higher energy.

It has also been found that there is a need for a new transmission arrangement which is adapted to accommodate radial motion of a rotary shaft while ensuring torque transmission thereto.

SUMMARY OF THE INVENTION

It is therefore an aim of the present invention to provide a new fluid damping bearing apparatus which provides improved damping capacity.

It is also an aim of the present invention to provide a new transmission arrangement which is adapted to compensate for rotor misalignment.

It is a further aim of the present invention to provide a new helicopter rotor support and drive arrangement.

Therefore, in accordance with the present invention, there is provided a fluid damper for absorbing radial motion of a bearing supporting a rotary shaft, comprising a number of circumferentially distributed fluid containing cylinders adapted to be concentrically placed about a bearing, each said fluid cylinder being radially oriented relative to the bearing and defining a chamber in which a piston is slidably displaceable against a damping fluid to oppose a radial movement of the bearing.

In accordance with a further general aspect of the present invention, there is provided a drive connection for a rotor shaft, comprising a driving member having a first meshing structure, a driven member adapted to rotate with a rotor shaft and having a second meshing structure, and an intermediate diaphragm coupling adapted to be mounted about the rotor shaft and having third and fourth meshing structures flexibly connected to each other for meshing engagement, respectively, with said first and second meshing structures for enabling said driven member to rotate with said driving member.

According to a further general aspect of the present invention, there is provided a helicopter rotor support and drive arrangement, comprising a stationary housing adapted to be rigidly mounted to an airframe of a helicopter, a helicopter rotor extending through said stationary housing, bearings for rotatably supporting said helicopter rotor in said stationary housing, a fluid damping structure for accommodating radial motion of said helicopter rotor relative to said stationary housing, a driving member mounted in said stationary housing and having a first meshing structure, a driven member for rotation with said helicopter rotor and having a second meshing structure, and an intermediate diaphragm coupling mounted about said helicopter rotor and having third and fourth axially spaced-apart meshing structures flexibly connected to each other for meshing engagement, respectively, with said first and second meshing structures to transmit a torque from said driving member to said driven member and said helicopter rotor.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
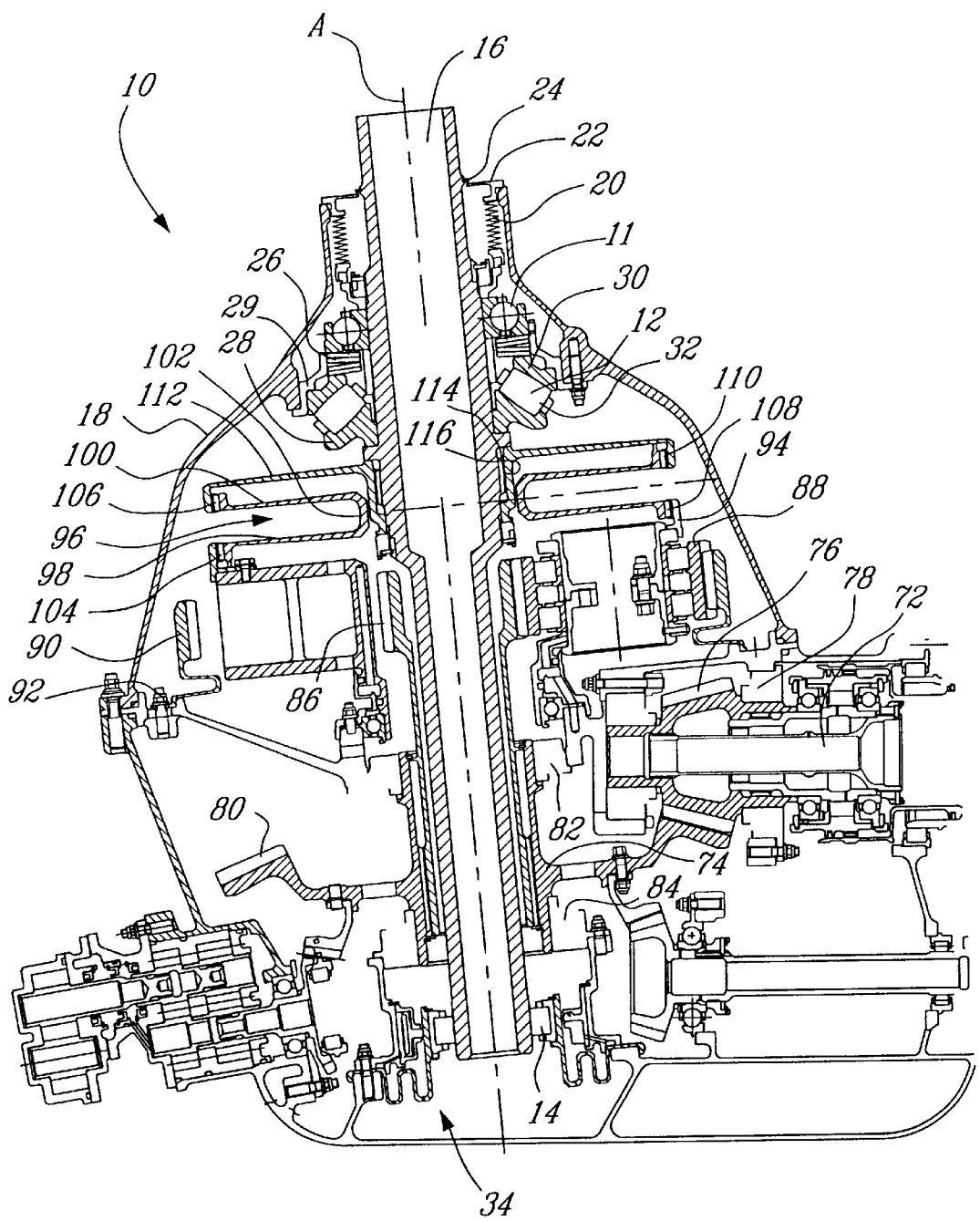
FIG. 1 is a cross-sectional view of a helicopter rotor support and drive arrangement.

FIG. 1 illustrates a main rotor shaft support and drive arrangement 10 suited for use in an integrated helicopter transmission wherein the engine and transmission of the helicopter are modularly assembled together into a single unit rigidly mounted to the helicopter frame, as disclosed in U.S. patent application Ser. No. 09/409,991 filed Sep. 30, 1999.

The support and drive arrangement 10 generally comprises a top thrust ball bearing 11, a spherical roller thrust bearing 12 and a bottom roller bearing 14 cooperating to rotatably support a helicopter rotor 16 extending upwardly through a stationary housing assembly 18 rigidly mounted to the helicopter frame (not shown).

The top thrust ball bearing 11 is press fitted about the rotor 16. Bellows 20 are attached at opposed ends thereof to the bearing 11 and a cover 22 fitted on the top of the housing assembly 18 about the rotor 16. The bellows 20 and the cover 22 are welded together and carry a carbon face seal element. The bellows 20 and the cover 22 can be bolted to the housing assembly 18. A spiral retaining ring 24 is mounted to the rotor 16 above the cover 22 to act as a slinger.

The spherical roller thrust bearing 12 is preloaded by the top thrust ball bearing 11 and a set of belleville disc springs 26. The spherical roller thrust bearing 12 includes an inner race 28 mounted to the rotor 16 for movement therewith, an outer race 30 for engagement with a complementary abutment structure 29 secured to the housing assembly 18, and a number of spherical rollers 32 placed between the inner and outer races 28 and 30. The outer race 30 and the abutment structure 29 cooperate to prevent axial removal of the rotor 16 while the helicopter is being operated.

Figure 2:
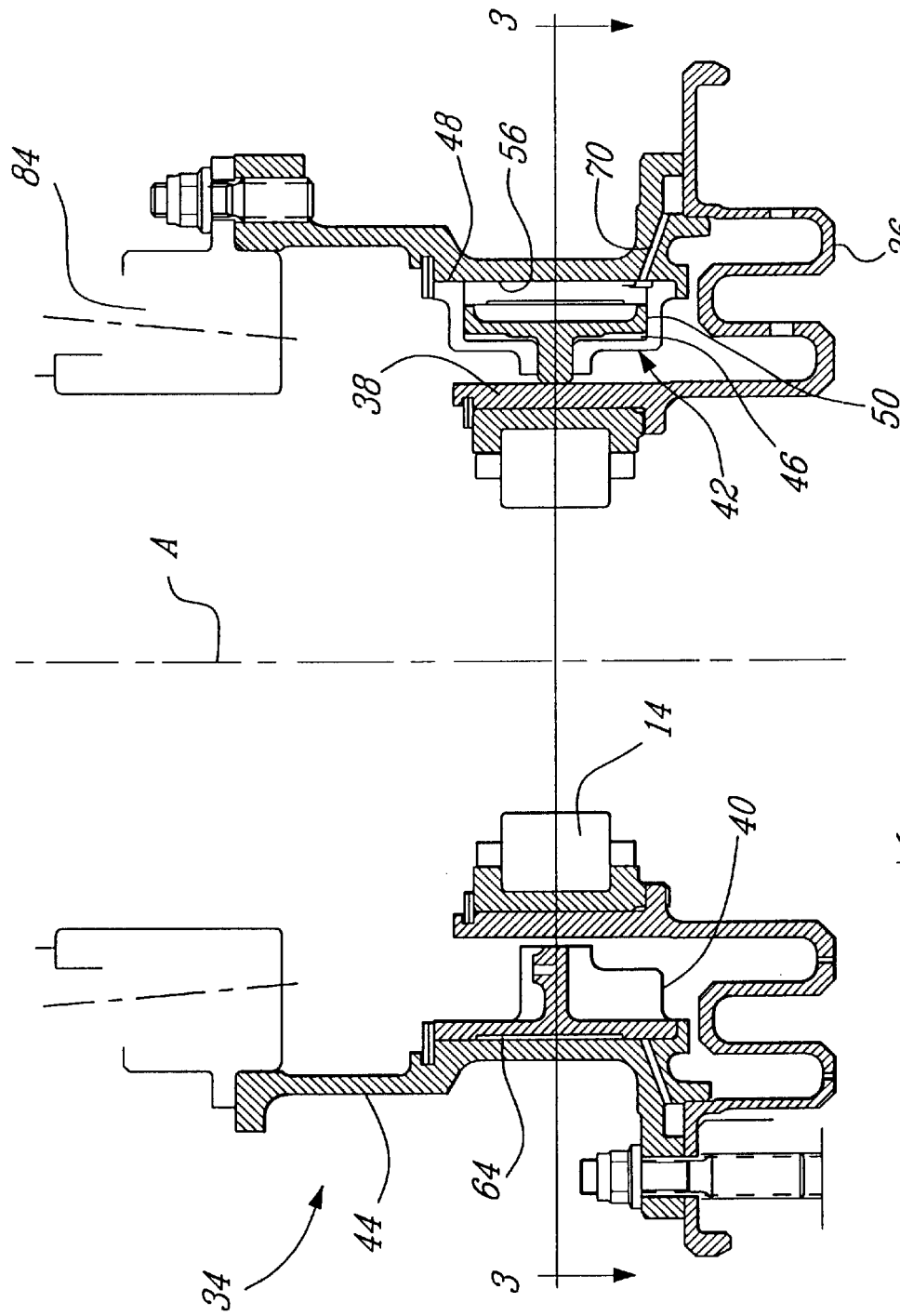
FIG. 2 is an enlarged cross-sectional view of a bottom portion of the helicopter rotor support and drive arrangement of FIG. 1.
Figure 3:
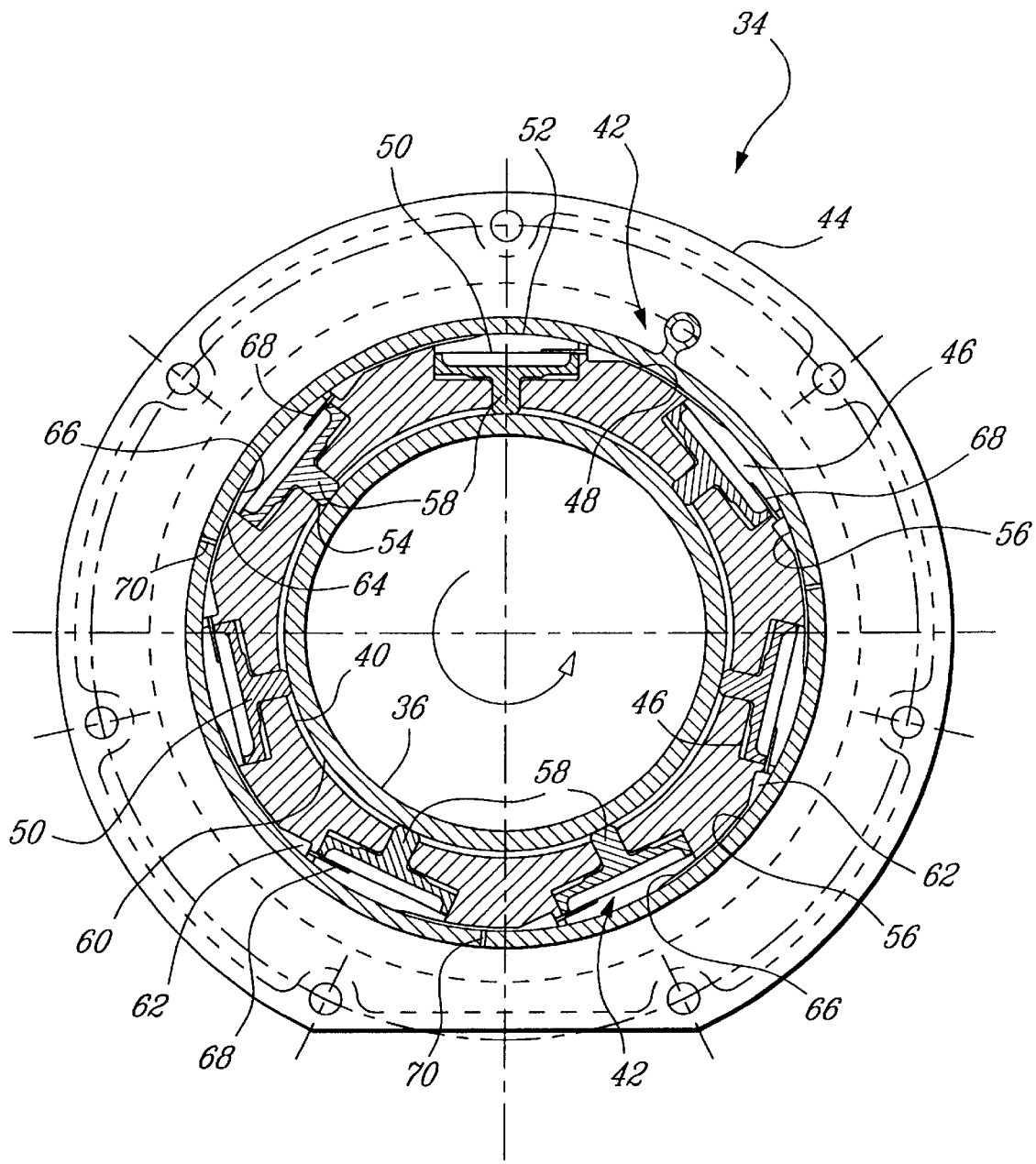
FIG. 3 is a cross-sectional view taken along line 3—3 in FIG. 2.

As shown in FIGS. 2 and 3, a fluid bearing damper 34 is provided about the bottom roller bearing 14 to accommodate and absorb vibrations due to rotor dynamics.

The fluid bearing damper 34 comprises a flexible support 36 secured to the housing 18 and having an axial cylindrical wall 38 for supporting the roller bearing 14. The flexible support 36 has a predetermined stiffness to maintain bearing concentricity while allowing the bearing 14, together with the rotor 16, to move in a radial direction around a central axis A of the rotor 16 in an orbital motion.

The cylindrical wall 38 of the flexible support 36 is fitted within a stationary cylinder ring 40 containing a number of interconnected oil cylinders 42. The ring 40 acts as a snubber limiting the flexible support 36 deflection. The ring 40 is, in turn, tightly fitted and supported within a cylindrical support 44 secured to the stationary housing 18.

As shown in FIG. 3, each oil cylinder 42 includes a chamber 46 defined in an outer annular surface 48 of the ring 40 and a piston 50 slidably mounted within the chamber 46 for movement in a radial direction relative to the central axis A of the rotor 16. The chambers 46 have respective first and second opposed ends 52 and 54. The first end 52 of each chamber 46 is closed by an inner cylindrical surface 56 of the support 44. Each piston 50 includes a piston rod 58 extending outwardly of the associated chamber 46 through the second end 54 thereof. The piston rods 58 extend radially inwardly of the ring 40 for engagement with an outer cylindrical surface 60 of the flexible support 36, thereby allowing each piston 50 to be pushed by the flexible support 36 against the damping fluid, i.e. the oil, to oppose a radial movement of the bearing 14 and the rotor 16.

Fluid passages 62 are provided between the chambers to connect the oil cylinders 42 in fluid flow communication. Each passage 62 is formed by the inner cylindrical surface 56 of the support 44 and a groove 64 defined in the outer surface 48 of the ring 40. The interconnecting passages 62 not necessarily have to be of the same size. However, the passages 62 all have a fluid inlet 66 and a fluid outlet 68. The fluid outlets 68 are provided at the first ends 52 of the chambers 46, whereas the fluid inlets 66 are located at a distance from these first ends 52 so as to be blocked by the pistons 50 when the same are pushed into the chambers 46 under bearing loads. This arrangement of the fluid passages 62 will ensure that the oil will mainly flow successively through each chamber 46 in a predetermined direction starting from one of the chambers 46 into which the associated piston 50 is pushed. Furthermore, by positioning the fluid inlets 66 on the side of the chambers 46 which corresponds to the rotating direction of the rotor 16, the flow of oil will be in the same direction as that of the shaft rotation.

The oil flow is regulated by a number of feed holes 70 defined in the support 44 and communicating with the passages 62. Oil bleeding occurs through the gap between the pistons 50 and the chambers 46.

The fluid bearing damper 34 operates similarly to conventional squeeze-film damper wherein an oil film is squeezed (sheared) under the action of bearing loads and whirling of the rotor, resulting in energy absorption. However, according to the present invention, the oil film is substituted by the cylinders 42 where squeezing oil creates much more resistance matching much higher loads and vibratory energy.

Referring to FIG. 1, it can be seen that a bevel gear 76 forming part of a drive assembly 72 is in meshing engagement with a reduction bevel gear 80 for transmitting the mechanical power generated by the helicopter engine (not shown) to the rotor 16.

The bevel gear 76 is journaled by suitable bearings 78 relative to the housing assembly 18. The reduction bevel gear 80 is provided with a central tubular portion 74 mounted about the rotor 16 via anti-friction bearings 82 and 84 respectively mounted to the housing assembly 18 and the support 44 via suitable means.

A sun gear structure 86 is disposed about the rotor 16 and is coupled at a lower end portion thereof to an inner surface of the central tubular portion 74 of the bevel gear 80 by a free spline. The sun gear structure 86 is meshed with a planet gear 88 which is also meshed with a fixed internal ring gear 90 concentrically disposed about the sun gear 86 and secured to the housing 18, such as at 92. The planet gear 88 is carried by a planet carrier 94 which is operatively connected to the rotor 16 via a flexible free spline coupling 96 designed to obtain highest misalignment capability.

The flexible free spline coupling 96 is provided in the form of two axially spaced-apart disc members 98 and 100 fitted about the rotor 16 and connected to each other via a cylindrical web 102 provided at an inner diameter of the disc members 98 and 100 to form a diaphragm structure having a low bending stiffness so as to allow the disc members 98 and 100 to flex relative to one another to compensate for the tilting of the rotor 16 during use.

The disc members 98 and 100 are respectively provided at the periphery thereof with first and second series of circumferentially distributed teeth 104 and 106. The first and second series of teeth 104 and 106 respectively form first and second splines. The first series of teeth 104 is in meshing engagement with a corresponding series of circumferentially distributed teeth 108 provided on an inner annular surface of the planet carrier 94. Likewise, the second series of teeth 106 is in meshing engagement with a corresponding series of circumferentially distributed teeth 110 provided on an inner annular surface of a disc member 112 connected to the rotor 16. The flexible free spline coupling 96 is freely fitted about the rotor 16 between the planet carrier 94 and the disc member 112 to transmit a torque therebetween, while allowing limited relative angular movement between the planet carrier 94 and the disc member 112, and, thus the rotor 16.

The disc member 112 is provided with an internal series of circumferentially distributed teeth 114 for meshing engagement with a corresponding axially extending teeth 116 provided on the rotor 16, thereby allowing a torque to be transferred from the disc member 112 to the rotor 16. It is understood that the disc 112 could be attached to the rotor 16 by a fixed spline or otherwise.

As seen in FIG. 1, the outer race 30 of the spherical roller bearing 12 is placed on an imaginary sphere having a center corresponding to the intersection of the central axis A of the helicopter rotor and a symmetric plane P of the free spline coupling 96 where the radial deflection of the rotor 16 and thereby the radial offset of the free spline coupling 96 are minimal.

Although the present invention has been described in the context of a helicopter rotor, it is understood that it could be used as well for supporting and driving rotary shafts in other applications.

What is claimed is:

1. A fluid damper for absorbing radial motion of a bearing supporting a rotary shaft, comprising a series of circumferentially distributed fluid containing cylinders adapted to be concentrically placed about the bearing, each one of said fluid cylinders being radially oriented relative to the bearing and defining a chamber in which a piston is slidably displaceable against a damping fluid to oppose a radial movement of the bearing.

2. A fluid damper as defined in claim 1, wherein said chambers are connected in fluid flow communication.

3. A fluid damper as defined in claim 2, wherein said chambers are serially interconnected in a loop configuration through fluid passages extending between the chambers, the fluid passages being arranged so that the damping fluid flows successively through each chamber in a predetermined direction starting from one of the chambers into which the associated piston is pushed.

4. A fluid damper as defined in claim 3, wherein said fluid passages have respective fluid inlets and fluid outlets, said fluid inlets being positioned so as to be blocked by said pistons when pushed into said chambers to a predetermined depth of insertion.

5. A fluid damper as defined in claim 4, wherein each piston has a piston rod extending outwardly from a first end of a corresponding one of said chambers opposite a second end thereof, and wherein said fluid outlets are located at the level of said second ends of said chambers.

6. A fluid damper as defined in claim 1, wherein said chambers are defined in a stationary ring member, and wherein each said piston includes a piston rod extending radially inwardly of said stationary ring member so as to be individually actuable in response to a radial motion of the bearing.

7. A fluid damper as defined in claim 6, wherein said stationary ring member is fitted within a cylindrical support having an inner surface tightly encircling an outer surface of said stationary ring member for closing each of said chambers.

8. A fluid damper as defined in claim 1, further including a support adapted to support the bearing concentrically within said series of circumferentially distributed fluid cylinders, while allowing restrained radial motion of the bearing under bearing loads.

9. A fluid damper as defined in claim 1, wherein said cylinders are provided on a ring, and wherein each said piston includes a piston rod extending radially inwardly of said ring for allowing said cylinders to be individually actuated by the bearing in response to a radial motion thereof.

10. A drive connection for a rotor shaft, comprising a driving member having a first meshing structure, a driven member adapted to rotate with a rotor shaft and having a second meshing structure, and an intermediate diaphragm coupling adapted to be mounted about the rotor shaft and having third and fourth meshing structures flexibly connected to each other for meshing engagement, respectively, with said first and second meshing structures for enabling said driven member to rotate with said driving member.

11. A drive connection as defined in claim 10, wherein said third and fourth meshing structures respectively include third and fourth series of circumferentially distributed teeth provided at the periphery of a pair of axially spaced-apart disc-shaped members connected at an inner diameter thereof by a web for allowing said disc-shaped members to flex relative to each other to compensate for misalignment of the rotor shaft.

12. A drive connection as defined in claim 10, wherein said diaphragm coupling is adapted to be freely fitted about the rotor shaft between the driving and driven members.

13. A drive connection as defined in claim 11, wherein said first meshing structure includes a first series of teeth circumferentially distributed on an inner diameter of said driving member, and wherein said second meshing structure includes a second series of teeth circumferentially distributed on a first inner diameter of said driven member.

14. A drive connection as defined in claim 13, wherein said driven member has a second inner diameter concentrically disposed within said first inner diameter thereof, and wherein a fifth series of circumferentially distributed teeth are provided on said second inner diameter and adapted for meshing engagement with corresponding teeth on the rotor shaft.

15. A helicopter rotor support and drive arrangement, comprising a stationary housing adapted to be rigidly mounted to an airframe of a helicopter, a helicopter rotor extending through said stationary housing, bearings for rotatably supporting said helicopter rotor in said stationary housing, a fluid damping structure for accommodating radial motion of said helicopter rotor relative to said stationary housing, a driving member mounted in said stationary housing and having a first meshing structure, a driven member for rotation with said helicopter rotor and having a second meshing structure, and an intermediate diaphragm coupling mounted about said helicopter rotor and having third and fourth axially spaced-apart meshing structures flexibly connected to each other for meshing engagement, respectively, with said first and second meshing structures to transmit a torque from said driving member to said driven member and said helicopter rotor.

16. An arrangement as defined in claim 15, wherein said third and fourth meshing structures include third and fourth series of teeth are respectively circumferentially distributed at the periphery of a pair of axially spaced-apart disc-shaped members connected at an inner diameter thereof by a web for allowing said disc-shaped members to flex relative to each other to compensate for misalignment of the rotor shaft.

17. An arrangement as defined in claim 15, wherein said diaphragm coupling is adapted to be freely fitted about the rotor shaft between the driving and driven members.

18. An arrangement as defined in claim 16, wherein said first meshing structure includes a first series of teeth circumferentially distributed on an inner diameter of said driving member, and wherein said second meshing structure includes a second series of teeth circumferentially distributed on a first inner diameter of said driven member.

19. An arrangement as defined in claim 18, wherein said driven member has a second inner diameter concentrically disposed within said first inner diameter thereof, and wherein a fifth series of circumferentially distributed teeth are provided on said second inner diameter for meshing engagement with corresponding teeth on said helicopter rotor.

20. An arrangement as defined in claim 15, wherein said bearings include top and bottom bearings, and wherein said fluid damping structure is position about said bottom bearing.

21. An arrangement as defined in claim 20, wherein said fluid damping structure comprises a series of circumferentially distributed fluid cylinders concentrically placed about said bottom bearing, each said fluid cylinder being radially oriented relative to said bottom bearing and defining a chamber in which a piston is slidably displaceable against a damping fluid to oppose a radial movement of the bottom bearing.

22. An arrangement as defined in claim 21, wherein said chambers are connected in fluid flow communication.

23. An arrangement as defined in claim 22, wherein said chambers are serially interconnected in a loop configuration through fluid passages extending between the chambers, the fluid passages being arranged so that the damping fluid flows successively through each chamber in a predetermined direction starting from one of the chambers into which the associated piston is pushed.

24. An arrangement as defined in claim 23, wherein said fluid passages have respective fluid inlets and fluid outlets, said fluid inlets being positioned so as to be blocked by said pistons when pushed into said chambers to a predetermined depth of insertion.

25. An arrangement as defined in claim 24, wherein each piston has a piston rod extending outwardly from a first end of a corresponding one of said chambers opposite a second end thereof, and wherein said fluid outlets are located at the level of said second ends of said chambers.

26. An arrangement as defined in claim 21, wherein said chambers are defined in a stationary ring member, and wherein each said piston includes a piston rod extending radially inwardly of said stationary ring member so as to be individually actuable in response to a radial motion of the bottom bearing.

27. An arrangement as defined in claim 26, wherein said stationary ring member is fitted within a cylindrical support rigidly supported in said stationary housing and having an inner surface tightly encircling an outer surface of said stationary ring member for closing each of said chambers.

28. An arrangement as defined in claim 21, further including a support secured to said stationary housing for supporting said bottom bearing concentrically within said series of circumferentially distributed fluid cylinders, while allowing restrained radial motion of said bottom bearing with said helicopter rotor.

29. An arrangement as defined in claim 21, wherein said cylinders are provided on a ring, and wherein each said piston includes a piston rod extending radially inwardly of said ring for allowing said cylinders to be individually actuated by said bottom bearing in response to a radial motion thereof.

30. An arrangement as defined in claim 20, wherein said top bearing includes a spherical roller thrust bearing having a number of rollers comprised between inner and outer races, said outer race being placed on an imaginary sphere having a center corresponding to the intersection of a central axis of the helicopter rotor and a symmetric plane of said diaphragm coupling.

* * * * *